(12) United States Patent
Grosch et al.

(10) Patent No.: US 12,121,984 B2
(45) Date of Patent: Oct. 22, 2024

(54) CUTTING TOOL

(71) Applicant: Ford Global Technologies, LLC, Dearborn, MI (US)

(72) Inventors: Guenter Hans Grosch, Vettweiß (DE); Rainer Kiehn, Frechen (DE); Krystian Dylong, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 17/478,240

(22) Filed: Sep. 17, 2021

(65) Prior Publication Data
US 2022/0080515 A1    Mar. 17, 2022

(30) Foreign Application Priority Data

Sep. 17, 2020   (DE) .......................... 102020211664.4

(51) Int. Cl.
| | | |
|---|---|---|
| *B23B 51/00* | (2006.01) | |
| *B23B 51/08* | (2006.01) | |
| *B23D 3/02* | (2006.01) | |
| *B23D 5/02* | (2006.01) | |
| *B23D 13/00* | (2006.01) | |

(52) U.S. Cl.
CPC .......... *B23B 51/0018* (2013.01); *B23B 51/08* (2013.01); *B23D 3/02* (2013.01); *B23D 13/00* (2013.01); *B23D 5/02* (2013.01)

(58) Field of Classification Search
CPC . B23B 51/0018; B23B 51/0036; B23B 51/08; B23B 2220/123; B23B 2220/126; B23C 2220/36; B23D 3/02; B23D 5/02; B23D 13/00; Y10T 29/5115
See application file for complete search history.

(56) References Cited

U.S. PATENT DOCUMENTS

| | | | |
|---|---|---|---|
| 6,942,438 B1 * | 9/2005 | Deguise ................ | B23B 29/04 |
| | | | 409/326 |
| 7,097,395 B2 * | 8/2006 | Horiuchi ................ | B23G 5/20 |
| | | | 408/1 R |
| 10,343,224 B2 * | 7/2019 | Habel ..................... | B23C 3/05 |

FOREIGN PATENT DOCUMENTS

| | | | | | |
|---|---|---|---|---|---|
| CN | 104475784 A | * | 4/2015 | ............ | B23D 13/00 |
| CN | 105397168 A | * | 3/2016 | | |
| DE | 19609798 A1 | * | 9/1997 | ........ | B23B 51/0018 |
| WO | WO-2009026932 A1 | * | 3/2009 | ........ | B23B 51/0018 |
| WO | WO-2009068130 A1 | * | 6/2009 | ........ | B23B 27/1614 |

* cited by examiner

*Primary Examiner* — Eric A. Gates
(74) *Attorney, Agent, or Firm* — Burris Law, PLLC

(57) ABSTRACT

A cutting tool for undercutting a bore in a component includes a shaft portion and at least one tangentially and axially cutting portion. The shaft portion extends in an axial direction relative to the component and has a maximum shaft radius. The cutting portion projects radially with respect to the shaft portion further than the maximum shaft radius. Each cutting portion includes a tangentially arranged lateral cutting edge configured to form a tangentially extending groove in the component. At least one cutting portion has a front cutting edge arranged axially at a front end thereof and configured to form an axially extending groove in the component.

19 Claims, 7 Drawing Sheets

CUTTING TOOL

CROSS-REFERENCE TO RELATED APPLICATIONS

This application claims priority to and the benefit of German Patent Application No. 102020211664.4, filed on Sep. 17, 2020. The disclosure of the above application is incorporated herein by reference.

FIELD

The present disclosure relates to a cutting tool and a connection method for a component.

BACKGROUND

The statements in this section merely provide background information related to the present disclosure and may not constitute prior art.

Plastics parts are connected to other parts in different technical fields. Among other things, the connection is based on a form and/or force fit, with connecting elements such as screws being used. In order to produce the corresponding connection, e.g. a screw therefore has to be secured to the plastic part. This is possible by direct screwing into the plastic part. It is also possible for the screw to cut a thread in the plastic part. However, depending on the type of plastic and the loading to be expected, a direct connection of this type may not be stable enough under certain circumstances. In particular, the screw, which generally consists of metal and thus has a significantly higher strength than the plastic, can cause damage through to the screw being pulled out. In order to inhibit this, often a bore is produced in the plastic part into which an insert is adhesively bonded, into which in turn the screw is screwed. The interposed insert alleviates the local action of force on the plastic part. The insert itself is manufactured from more stable material than the plastic part, which makes it unlikely that the screw is pulled out of the insert. This connection technology is problematic, however, in that the bore typically has a smooth, cylindrical inner wall, and therefore the adhesive used for the fastening can become detached together with the insert. Apart from plastic parts, adhesively bonding an insert into a bore is also known for other components which do not consist of plastic but consist of other materials, such as e.g. ceramic or metal. Similar problems can result there.

In light of the identified prior art, the secure anchoring of an insert element in a bore of a component, in particular a plastic part, still has room for improvements.

SUMMARY

This section provides a general summary of the disclosure and is not a comprehensive disclosure of its full scope or all of its features.

The present disclosure provides a cutting tool for securely anchoring an insert element in a bore of a component.

In one form, a cutting tool for undercutting a bore in a component is disclosed. The cutting tool includes a shaft portion and at least one tangentially and axially cutting portion. The shaft portion extends in an axial direction relative to the component and has a maximum shaft radius. The cutting portion projects radially with respect to the shaft portion further than the maximum shaft radius. Each cutting portion includes a tangentially arranged lateral cutting edge configured to form a tangentially extending groove in the component. At least one cutting portion has a front cutting edge arranged axially at a front end thereof and configured to form an axially extending groove in the component.

It should be noted that the features and measures specified individually in the following description can be combined with one another in any desired technically meaningful way and disclose further configurations of the disclosure. The description additionally characterizes and specifies the disclosure, in particular in conjunction with the figures.

The present disclosure provides a cutting tool for undercutting a bore in a component. That is, the cutting tool creates at least one undercut in a bore of a component. The term "bore" here and in the following text should not be interpreted as meaning that the bore actually has to have been created by boring or another machining method. Rather, the bore is generally a normally cylindrical cutout within the component that is open at least on one side and may also have been created by primary shaping during the production of the component. It is typically a blind cutout or blind bore, but could also be a continuous cutout or through-bore. The component may be in the form of e.g. a metal part, a ceramic part or in particular a plastic part. Different polymers, in particular thermoplastics but also thermosetting plastics or, if appropriate, elastomers, come into consideration as the material of such a plastic part. In order to be able to process the material of the component, the cutting tool normally comprises metal, for example steel. However, other materials which have sufficient hardness or wear resistance, such as for example ceramic, are also conceivable. It is also possible that the cutting tool has a surface coating at least in certain regions. The cutting tool is normally in one piece and has an intrinsically rigid form.

The cutting tool has a shaft portion which extends axially in relation to a front end and has a maximum shaft radius. The radial direction and the tangential direction are also implicitly defined by the axial direction, which normally corresponds to a longitudinal axis (or tool axis) and to the greatest extent of the cutting tool. The shaft portion of the cutting tool extends in the axial direction in relation to a front end, which could also be referred to as the "distal end". The distal end is that end which, as intended, is introduced into the bore first. An oppositely situated rear (or proximal) end of the cutting tool may be configured for accommodation in a tool fitting, e.g. a chuck. The shaft portion may have an at least partially rotationally symmetrical form with respect to the axial tool axis. The shaft portion has a maximum shaft radius in radial terms, that is to say in the radial direction. This maximum shaft radius designates the greatest extent of the shaft portion in a radial direction, wherein the designation "shaft radius" should not be interpreted to mean that the shaft portion has to have a rotationally symmetrical form as a whole or in the region of the maximum shaft radius. In this respect, reference could be made in general also to a maximum radial extent. In some forms, the shaft portion has a cylindrical form at least in certain regions, wherein the cylinder radius corresponds to the maximum shaft radius.

The cutting tool also has at least one tangentially and axially delimited cutting portion which projects radially with respect to the shaft portion beyond the maximum shaft radius. As already set out above, the cutting tool is normally formed in one piece, and therefore the cutting portion is also formed in one piece with the shaft portion. The respective cutting portion is delimited both in the tangential direction and in an axial direction. In the tangential direction, it normally extends over an angle of less than 180°, preferably less than 90°, further preferably less than 45°. In an axial direction, its extent may correspond for example to less than 25% or less than 10% of the extent of the shaft portion. While the radial extent of the shaft portion is delimited by the maximum shaft radius, each cutting portion projects in a radial direction with respect to the shaft portion, such that it protrudes beyond the maximum shaft radius. It could also be said that the respective cutting portion in a radial direction has a radial extent, which can also be referred to as the cutting radius and is larger than the maximum shaft radius.

Each cutting portion has a tangentially laterally arranged lateral cutting edge for creating a tangentially extending undercut groove. In this respect, "each cutting portion" relates to a single cutting portion, if the cutting tool has exactly one cutting portion. The lateral cutting edge is arranged tangentially on the side of the cutting portion. It may be formed for example by a lateral cutting edge, which is formed at the transition from a radially outwardly facing face of the cutting portion to an outer face which faces tangentially to the side. The lateral cutting edge may create a tangentially extending undercut groove within the bore or within a wall of the bore. The corresponding undercut groove is produced when the cutting tool is rotated in the tangential direction around the above-mentioned tool axis or longitudinal axis, provided that the dimensions of the cutting tool and the bore are matched to one another such that the cutting radius is larger than a bore radius of the bore, while the shaft radius is slightly smaller than the bore radius. In this way, the shaft portion can rotate within the bore in a contactless (or at least low-friction) manner, while the cutting portion cuts out the undercut groove mentioned by means of the lateral cutting edge.

At least one primary cutting portion has a front cutting edge, arranged axially at the front, for creating an axially extending introducing groove. Stated differently, at least one cutting portion is in the form of a primary cutting portion, which comprises the front cutting edge in addition to the lateral cutting edge. The front cutting edge is arranged axially at the front, that is to say on a side of the primary cutting portion which is axially at the front or faces toward the front end. It may have a cutting edge, for example, which is formed at the transition from the above-described, radially outwardly facing face of the cutting portion to a front face facing axially toward the front. The front cutting edge may create an axially extending introducing groove within the bore or within a wall of the bore. The corresponding introducing groove is produced when the cutting tool is introduced into the bore at least in part in an axial direction, provided that the dimensions of the cutting tool and the bore are matched to one another such that the cutting radius is larger than a bore radius of the bore, while the shaft radius is slightly smaller than the bore radius. In this way, the shaft portion can be introduced into the bore in a contactless (or at least low-friction) manner, while the cutting portion cuts out the introducing groove by means of the front cutting edge. The introducing groove extends in a manner corresponding to the movement of the cutting tool when it is being introduced axially, but it does not necessarily have to run parallel to the axial direction. It would be possible, for example, for the axial movement to be superposed in part by a tangential movement, resulting in an introducing groove which is helical at least in certain portions.

The front cutting edge makes it possible for the primary cutting portion, when it is being introduced, to cut the introducing groove described, which first makes it possible to introduce the cutting tool into the bore. When the cutting tool has been introduced into the bore up to an intended depth, the described rotation can be performed, as a result of which each cutting portion with its lateral cutting edge creates a tangentially extending undercut groove. Both the undercut groove and the introducing groove improve the structure of the bore to the extent that an insert or insert element can be adhesively bonded into the bore in an improved manner. First, adhesive can flow into the respective groove and, after hardening, form a form fit there in addition to the material bond, specifically through the introducing groove substantially in the tangential direction and through the undercut groove substantially in the axial direction. Detachment of the adhesive bond, in particular pulling out or breaking off of the adhesive bond, is reduced. However, the grooves, in particular the introducing groove, also have a secondary function in terms of the bond. Thus, any excess adhesive can be diverted into the groove, such that the adhesive as a whole needs to be metered less precisely, without the possibility of adhesive oozing out of the opening in the bore.

The cutting tool according to the present disclosure may be used in particular in a connection method according to the present disclosure for a component, which method will be described below.

In a first step, a bore is produced in the component. Possible designs of the component and of the bore have already been explained above, this not being repeated at this juncture. However, it should again be pointed out that the production of the bore may be effected already by primary shaping during the production of the component. It goes without saying that what is normally produced is a cylindrical bore with a bore radius which is slightly larger than the maximum shaft radius but smaller than the cutting radius of each cutting portion.

In a further step, a cutting tool according to the present disclosure is introduced into the bore, wherein at least one axially extending introducing groove is cut by at least one front cutting edge of a primary cutting portion. The movement of the cutting tool during the introduction is axial at least in part, i.e. the cutting tool may be introduced parallel or obliquely to the axial direction, as a result of a combination of an axial and a tangential movement. In the former case, what is produced is an introducing groove which runs parallel to the axial direction; in the latter case, it is a helical introducing groove. If a plurality of primary cutting portions are present, a plurality of introducing grooves can be created.

After the introduction, the cutting tool is rotated within the bore, wherein a tangentially extending undercut groove is cut by at least one lateral cutting edge of a cutting portion. The rotation is evidently effected in the tangential direction, or around the axial tool axis. This tangential movement could optionally also be combined with an axial movement, which would result in the undercut groove likewise receiving the form of a helix. Normally, however, it would be a pure rotational movement about the tool axis, with the result that the undercut groove runs in the tangential direction. If a plurality of cutting portions are present, a plurality of undercut grooves may be created, as will be explained further below.

After this, the cutting tool is guided out of the bore, wherein each cutting portion is guided by an introducing groove. Correspondingly, the cutting tool has to be rotated into a position in which each cutting portion ends up in the tangential position of an introducing groove. There are two different possibilities for this. Either the cutting tool, when the undercut groove is being produced, can be rotated far enough that the undercut groove opens out again into an introducing groove, or the cutting tool could be rotated as far as a certain rotational angle, wherein the undercut groove has a blind end to some extent, and then the cutting tool could be rotated in the opposite direction, as a result of which the respective cutting portion returns to in the position it had before the cutting of the undercut groove.

After the cutting tool has been guided out, an insert element is adhesively bonded into the bore, wherein an adhesive is introduced at least partially into an undercut groove. The insert element (which can also be referred to as an insert) may be provided in particular for the purpose of screwing in a screw, by means of which another second component is screwed on the first component. In this respect, the insert element usually has a cutout, into which the screw is screwed. This cutout may have a prefabricated internal thread. More generally, however, the insert element is any desired element which is configured to be introduced into the bore and adhesively bonded therein. The insert element may be manufactured from different materials, e.g. from metal, plastic, ceramic or composite material. An adhesive may be introduced before the insert element is inserted into the bore, and/or the insert element may be provided with the adhesive. In any case, the adhesive, possibly only when the insert element is being introduced, is introduced at least partially into an undercut groove (or into a plurality of undercut grooves). In this way, after the adhesive has hardened, the form fit described above, which reduces the pulling-out or breaking-out of the adhesive from the bore, is formed in an axial direction.

It should be noted that optionally at least one further method step may be performed between each two of the method steps explicitly mentioned here. In this way, it is possible, for example after the cutting tool has been guided out and before the insert element is adhesively bonded in, for the bore to be cleaned, during which chips produced when the grooves are cut are removed.

According to one form, the cutting tool has at least one secondary cutting portion which is arranged axially to the rear of a primary cutting portion and is spaced apart therefrom. The secondary cutting portion normally does not have a front cutting edge, but merely has the lateral cutting edge described above. It is arranged axially to the rear of the primary cutting portion, which means that in the axial direction it is further away from the front end than is the primary cutting portion. It is spaced apart, in particular spaced apart in the axial direction, from the primary cutting portion, and may cut a further undercut groove, that is to say in addition to that undercut groove which is cut by the primary cutting portion. Since the primary cutting portion and the secondary cutting portion are connected rigidly to one another and are thus arranged in a positionally fixed manner relative to one another, the undercut grooves produced by the cutting portions run parallel to one another. Such a plurality of undercut grooves makes it possible to further improve the above-mentioned advantages, in particular the form fit in an axial direction. When introducing the tool and when guiding it out of the bore, the respective secondary cutting portion has to be guided through an introducing groove which was cut beforehand by a primary cutting portion. In order to minimize the risk of jamming or twisting in this case, the primary cutting portion may have a primary cutting radius which is slightly larger than a secondary cutting radius of the respective secondary cutting portion. It goes without saying that the secondary cutting radius is however still larger than the maximum shaft radius.

According to one form of the present disclosure, the cutting tool has a plurality of secondary cutting portions which are spaced apart axially. In this way, two or more secondary cutting portions, which are respectively spaced apart from one another axially, may be arranged axially to the rear of a primary cutting portion. Each of the secondary cutting portions can cut a dedicated undercut groove by way of their lateral cutting edges. A plurality of secondary cutting portions, in addition to the primary cutting portion, thus makes it possible to increase the number of undercut grooves, this generally improving the possibilities for a form fit with the adhesive.

If one or more secondary cutting portions are arranged axially to the rear of a primary cutting portion, they are arranged one behind another with respect to the axial direction. It is provided here that the at least one secondary cutting portion is guided through the introducing groove created by the primary cutting portion. That is, the relative position of the cutting portions has to be matched to the form of the introducing groove. Therefore, if the cutting portions are offset not only axially but also tangentially in relation to one another, a helical introducing groove has to be cut in, this constituting an unnecessary complication under certain circumstances. Therefore, a plurality of cutting portions are arranged axially in line with one another. It could also be said that the cutting portions lie on a line in an axial direction. Correspondingly, these can be introduced along an axially aligned introducing groove and the desired movement of the cutting tool when it is being introduced and when it is being guided out is axial.

When the various grooves are being cut, as in any machining operation a removal of material occurs, which under certain circumstances could become jammed between the cutting tool and the bore wall. Although this could be counteracted by selecting a greater difference between the maximum shaft radius and the bore radius, resulting in a large intermediate space, this could make the correct alignment of the cutting tool within the bore more difficult. Advantageously, the shaft portion has at least one tangentially extending lateral depression, which draws back radially with respect to adjacent regions of the shaft portion. The corresponding lateral depression serves to receive material that has been removed without it becoming jammed between the cutting tool and the component. It extends in the tangential direction and may in particular extend tangentially around the circumference, that is to say has an annular form. It points back radially with respect to adjacent regions of the shaft portion, i.e. the radial extent of the shaft portion is smaller at the lateral depression than in adjacent portions. Reference could also be made to a cutout or depression in a radial direction. In terms of its function, the lateral depression may also be regarded as a lateral chip receptacle. The lateral depression may in particular be in the form of a groove.

At least one lateral depression is arranged axially adjacent to a cutting portion. In this way, the cutting portion makes it possible for material that has been removed to be received particularly easily in the lateral depression. In particular, a respective lateral depression may be arranged axially to the rear of each cutting portion.

The lateral depression described makes it possible to receive in particular material produced when an undercut groove is being cut. By contrast, it is less well suited to receive material which is removed when the introducing groove is being cut. In order to counteract this problem, a front end depression is formed on the front end which draws back axially toward the rear and is arranged adjacent to the front cutting edge of a primary cutting portion. In this respect, the front end may have a predominantly flat end face, which runs perpendicularly to the axial direction. As an alternative, the front end may have for example a conical end face, the form of which approximates that of a drill, by means of which the bore can be produced. The latter may be advantageous e.g. when the bore has not been processed deeply enough, so as to provide that the cutting tool can reach the base of the bore. The front depression may be formed in the respective end face. In particular, it may run transversely to the axial direction through the end face. Since the front depression is formed adjacent to the front cutting edge, chips and/or material that has been removed can pass from the front cutting edge into the front depression particularly easily.

According to one form, the cutting tool has at least two cutting portions, which are offset tangentially in relation to one another and are arranged axially at least partially at the same height. In particular, at least two primary cutting portions may be arranged in this way. In addition, one or more secondary cutting portions may be arranged axially to the rear of each of the primary cutting portions, and therefore reference can also be made to at least two groups of cutting portions that are offset tangentially in relation to one another. The cutting portions mentioned are normally distributed symmetrically about the tool axis, with the result that when there are two cutting portions, they are offset tangentially in relation to one another by 180°, while three cutting portions are offset in relation to one another by 120°, for example. Two primary cutting portions and two secondary cutting portions or two groups of secondary cutting portions which are offset by 180° or arranged on opposite sides of the tool axis are provided. The symmetrical arrangement achieves a symmetrical distribution of the forces between the cutting tool and the component when the grooves are being cut. When the cutting tool is introduced into the bore as described above, an introducing groove is cut out by each primary cutting portion, wherein the introducing grooves are situated opposite one another or are offset in relation to one another by 180°. A variant of the method according to the present disclosure is that the cutting tool is subsequently rotated by 180°, wherein each cutting portion cuts out a circular arc of 180° of a respective undercut groove, resulting overall in a tangentially encircling undercut groove. Subsequently, each primary cutting portion (and, if appropriate, the secondary cutting portions arranged axially to the rear thereof) may be guided out of the bore again through the introducing groove cut by the respective other primary cutting portion.

As described above, the use of the cutting tool according to the present disclosure in the case of the method allows an improved anchoring of the insert element by virtue of the form fit which the adhesive forms with the undercut groove. Depending on the loading, however, a further improved anchoring in which a form fit is produced between the insert element and at least one undercut groove may be advantageous. According to a corresponding method variant, the insert element has at least one radial projection and is first introduced into the bore for the purpose of being adhesively bonded in, by guiding the projection through an introducing groove. In this respect, the radial projection is a region of the insert element that projects in a radial direction and the outer dimension of which exceeds the bore radius, but not the cutting radius. It can therefore be passed through the introducing groove. After the introduction, the insert element is rotated, as a result of which the projection is guided out of the introducing groove into an undercut groove. Within the undercut groove, the projection forms a form fit in the axial direction with the component. The form fit inhibits a simple pulling-out operation. This would be possible only after previous rotation of the insert element, this in turn being inhibited by the adhesive. A rotation of the insert element within the bore is normally inhibited in that the adhesive has also penetrated into the axial introducing groove and forms a form fit therewith. In the forms illustrated here, the insert element may also have a plurality of projections, the number and relative arrangement of which corresponds to those of the cutting portions on the cutting tool. When the cutting tool has for example two primary cutting portions and two secondary cutting portions which are respectively offset in relation to one another by 180°, the insert element may have four correspondingly arranged radial projections. This form may advantageously also be combined with the form described above, in which the undercut grooves have a blind end. In this case, the end of the respective undercut groove forms a stop for a projection, resulting in the definition of a desired end position when the insert element is being rotated.

In another form, a cutting tool for undercutting a bore in a component is disclosed. The cutting tool includes a shaft portion and at least one tangentially and axially cutting portion. The shaft portion extends in an axial direction relative to the component and has a maximum shaft radius. The cutting portion projects radially with respect to the shaft portion further than the maximum shaft radius. Each cutting portion includes a tangentially arranged lateral cutting edge configured to form a tangentially extending groove in the component. At least one lateral depression is formed in the shaft portion and arranged axially adjacent to a respective primary cutting portion. At least one cutting portion has a front cutting edge arranged axially at a front end thereof and configured to form an axially extending groove in the component.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
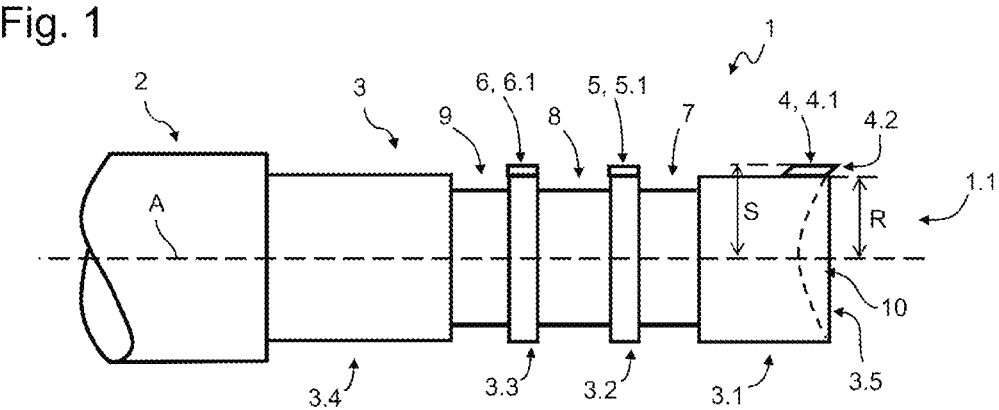
FIG. 1 is a side view of a first form of a cutting tool according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the different figures, identical parts are always provided with the same reference signs, for which reason these parts are generally also described only once.

Figure 2:
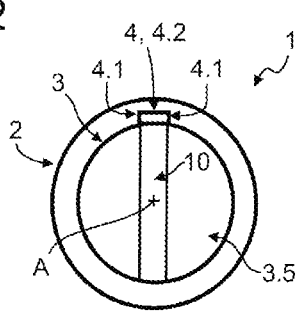
FIG. 2 is a front view of the cutting tool of FIG. 1.
Figure 7:
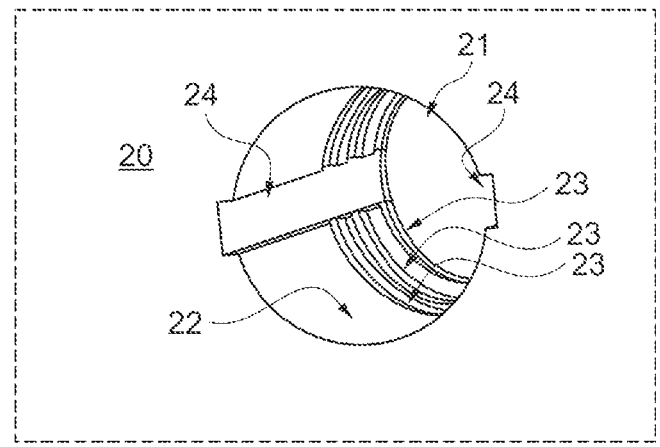
FIG. 7 is a perspective view of a part with a bore.

FIGS. 1 and 2 show a first form of a cutting tool 1 according to the present disclosure. The cutting tool 1 forms various grooves 23, 24 in the wall 22 of a bore 21 of a part 20 as shown in FIG. 7. The part 20 may be a plastic part, for example. The cutting tool 1 has a roughly cylindrical form overall and extends along an axial tool axis A. It is manufactured as a whole in one piece from steel. The cutting tool 1 includes a holding portion 2, which is provided for clamping in a tool fitting (e.g. a chuck), and an adjoining shaft portion 3, which extends in an axial direction toward a front end 1.1. The front end 1.1 is the part of the cutting tool 1 which is arranged right at the front when the cutting tool is being introduced into the bore 21.

The shaft portion 3 has a plurality of cylinder portions 3.1-3.4, the radial dimensions of which correspond to a respective maximum shaft radius R. Arranged between a first cylinder portion 3.1 and a second cylinder portion 3.2 is a first lateral annular groove 7, which draws back inwardly in the radial direction with respect to the adjacent cylinder portions 3.1, 3.2. Correspondingly, a second lateral annular groove 8 is arranged between the second cylinder portion 3.2 and a third cylinder portion 3.3, and a third lateral annular groove 9 is arranged between the third cylinder portion 3.3 and a fourth cylinder portion 3.4. At the front end 1.1, the shaft portion 3 has a flat end face 3.5 which runs perpendicularly to the tool axis A and thus tangentially-radially. As can be seen in particular in FIG. 2, a front groove 10, which draws back rearwardly in an axial direction with respect to the end face 3.5, passes through this end face transversely to the tool axis A.

Formed on the first cylinder portion 3.1 is a primary cutting portion 4, which has a front cutting edge 4.2 at the front in an axial direction and a lateral cutting edge 4.1 to either side in the tangential direction. In this case, the primary cutting portion 4 is restricted to an angular range of approx. 20° in the tangential direction, and in an axial direction has an extent which corresponds to approximately 10% of the entire extent of the shaft portion 3. This should be understood only in an exemplary fashion, however, and a smaller or larger extent would be conceivable both in an axial and in the tangential direction. The primary cutting portion 4 projects in a radial direction with respect to the shaft portion 3, with the result that its radial extent surpasses the maximum shaft radius R and thus defines a cutting radius S. Formed axially in line with the primary cutting portion 4 on the second cylinder portion 3.2 is a first secondary cutting portion 5 and on the third cylinder portion 3.3 is a second secondary cutting portion 6. The axial extent of the secondary cutting portions 5, 6 corresponds to that of the associated cylinder portion 3.2, 3.3 in this example. In the tangential direction, on either side, the secondary cutting portions 5, 6 mentioned have lateral cutting edges 5.1, 6.1, which correspond to the lateral cutting edges 4.1 of the primary cutting portion 4. The radial extent of the secondary cutting portions 5, 6 may correspond to the cutting radius S or may be selected to be slightly smaller. The lateral cutting edges 4.1, 5.1, 6.1 may be formed on either side of the cutting portions 4, 5, 6, respectively. In some forms, the lateral cutting edges 4.1, 5.1, 6.1 may be formed on only one side of the cutting portions 4, 5, 6, respectively.

In the case of a connection method according to the present disclosure for a part 20, first a cylindrical bore 21 is produced in the part 20, the bore radius of which is slightly larger than the maximum shaft radius R, but smaller than the cutting radius S. Then, the cutting tool 1 is introduced into the bore 20 with the front end 1.1 to the fore, wherein the cylindrical shaft portion 3 can be introduced substantially in a contactless or at least a low-friction manner, while an axial introducing groove 24 is cut into a wall 22 of the bore 21 by the projecting primary cutting portion 4 with the front cutting edge 4.2 thereof. In this respect, the cutting tool 1 is moved axially into the bore 20 with a desired feed force. The secondary cutting portions 5, 6, which are arranged axially in line with one another to the rear of the primary cutting portion 4 are moved here through the introducing groove 24, which was created by the primary cutting portion 4. Material that has been removed, which was produced when the introducing groove 24 was being cut, can be received in the front groove 10. When a desired depth is reached, for example when the end face 3.5 reaches the base of the bore, the axial feed is ended and the cutting tool 1 is rotated tangentially around the tool axis A. This results in the cutting portions 4, 5, 6 cutting out tangential undercut grooves 23 by way of their lateral cutting edges 4.1, 5.1, 6.1. In this respect, material that has been removed can be received in the lateral annular grooves 7, 8, 9. The cutting tool 1 is rotated by 360° as a whole, and therefore the undercut grooves 23 are intrinsically annularly closed. Since in this example the lateral cutting edges 4.1, 5.1, 6.1 are formed to either side of the cutting portions 4, 5, 6, the direction of rotation does not matter. If a lateral cutting edge 4.1, 5.1, 6.1 were formed on only one side, the position thereof would prescribe the direction of rotation.

After the full rotation around 360°, the cutting portions 4, 5, 6 are in turn arranged in the previously created introducing groove 24, and therefore the cutting tool 1 can be guided out of the bore 21 again by an axial movement. Then, an insert part 30 can be adhesively bonded in the bore 21 by means of an adhesive as shown in FIGS. 9-12. It is possible to withdraw from the bore 21 material that was also removed in advance. The adhesive penetrates here into the previously created grooves 23, 24, which are free of material that is to be cut, and after hardening forms a form fit with the part 20 both in an axial direction and in the tangential direction. Detachment of the insert part 30 with the adhesive is therefore reduced. The insert part 30 may be formed in the manner of a sleeve and have a cutout 31, into which a screw can be screwed in order to secure another component to the plastic part 20. A further advantage resulting from the presence of the grooves 23, 24 is that any excess adhesive penetrates especially into the mentioned grooves 23, 24 instead of oozing out of the opening in the bore 21. Accordingly, the adhesive needs to be metered less precisely.

Figure 3:
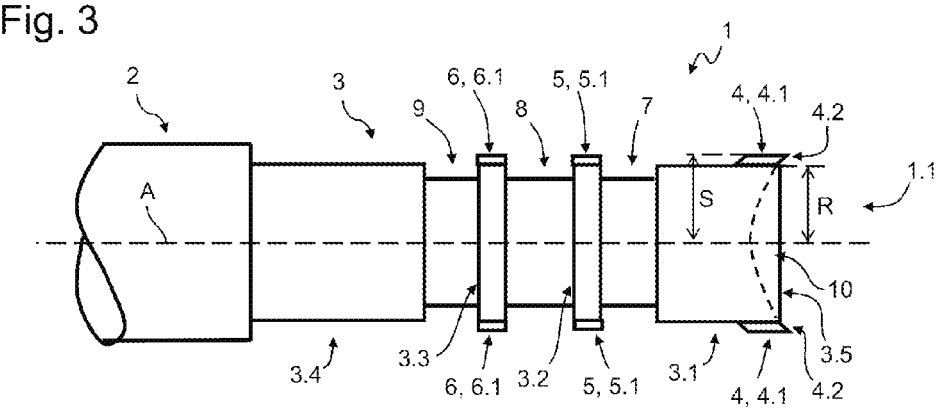
FIG. 3 is a side view of a second form of a cutting tool according to the present disclosure.
Figure 4:
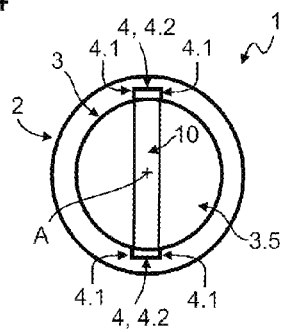
FIG. 4 is a front view of the cutting tool of FIG. 3.

FIGS. 3 and 4 show a second form of a cutting tool 1 according to the present disclosure, which is similar to the first form described above and to this extent is not explained again in detail. However, in the case of this cutting tool 1 two primary cutting portions 4, which are offset by 180°, are provided. Correspondingly, two first secondary cutting portions 5 and two second secondary cutting portions 6 are provided. When the cutting tool 1 is being introduced into the bore 20, on account of the form illustrated two introducing grooves 24 offset in relation to one another by 180° are cut. This achieves a symmetrical distribution of force, thus simplifying the cutting operation under certain circumstances. In order to create the undercut grooves 23, it is desirable to rotate the cutting tool 1 by 180°, as a result of which each primary cutting portion 4 passes into that introducing groove 24 which the respective other primary cutting portion 4 has cut. A symmetrical distribution of force on the cutting tool 1 is also produced when the undercut grooves 23 are being cut, which makes it possible to guide the cutting tool in a more stable manner.

Figure 8:
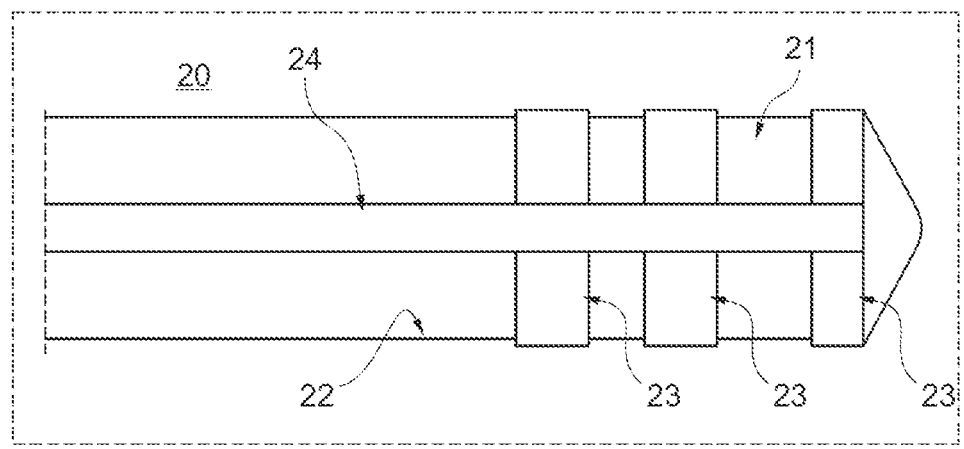
FIG. 8 is a cross-sectional view of the part of FIG. 7.
Figure 9:
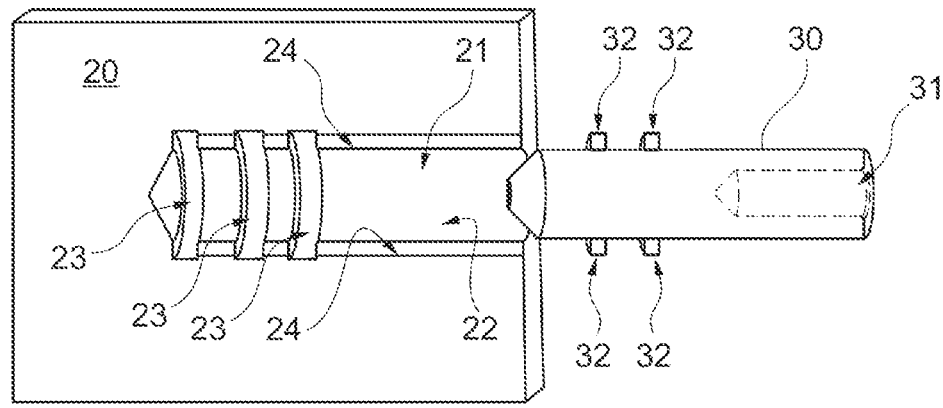
FIGS. 9-12 are cross-sectional views of various stages of an operation of connecting an insert element to the part of FIG. 7.

FIGS. 7 and 8 show a part 20 with a bore 21, in which in the manner described two mutually opposite introducing grooves 24 have been created and also three annularly closed undercut grooves 23.

Figure 5:
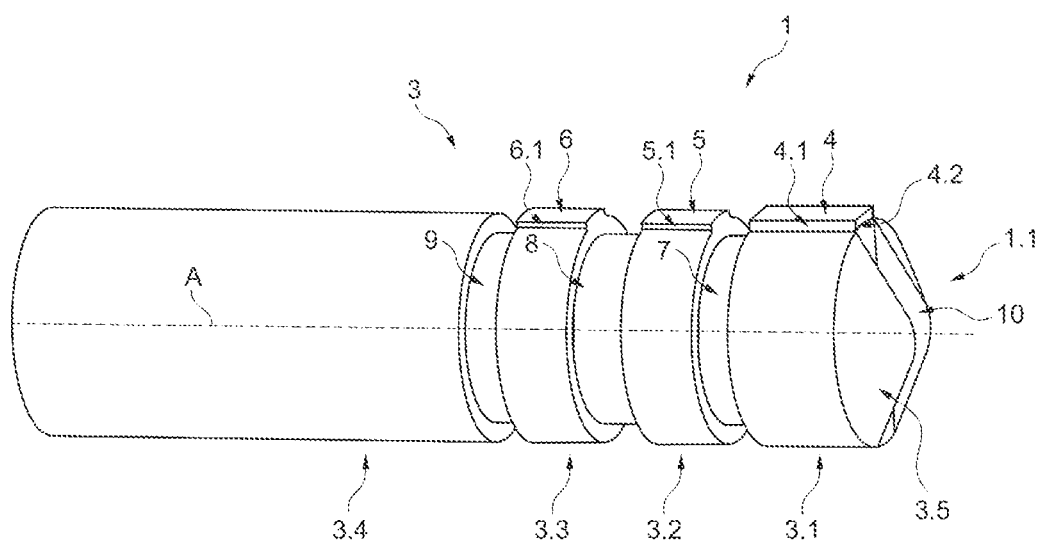
FIG. 5 is a perspective view of a third form of a cutting tool according to the present disclosure.
Figure 6:
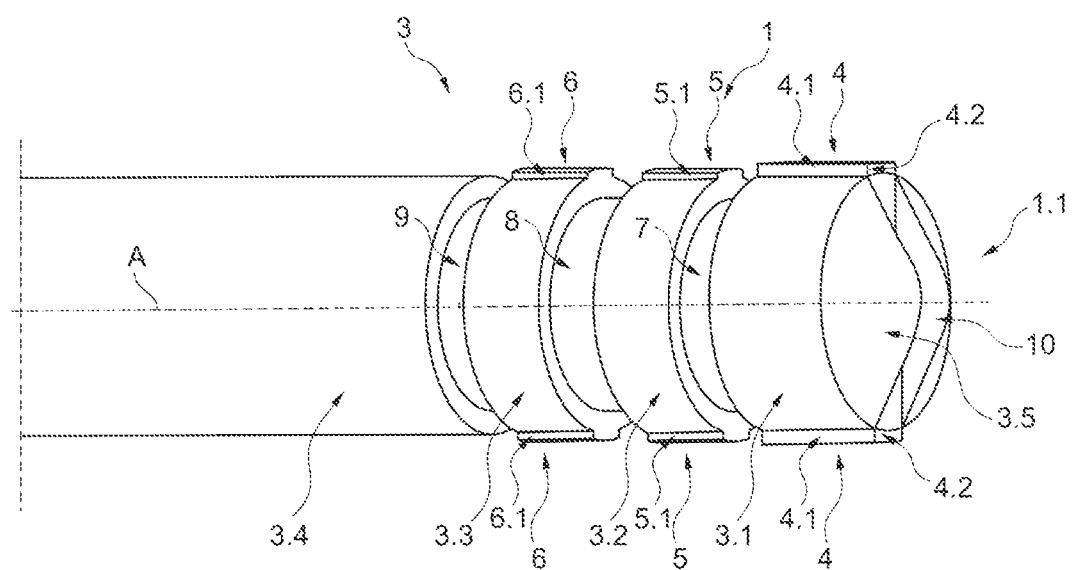
FIG. 6 is a perspective view of a fourth form of a cutting tool according to the present disclosure.

FIGS. 5 and 6 show a third form and a fourth form of a cutting tool 1 according to the present disclosure, which is similar to the first and second forms, described above, and to this extent are not explained again in detail. Apart from the fact that in FIGS. 5 and 6 no offset holding portion 2 is provided, these forms differ in that a conical end face 3.5, through which in turn passes the front groove 10, which runs transversely to the axial direction, is formed on the front end 1.1.

Figure 10:
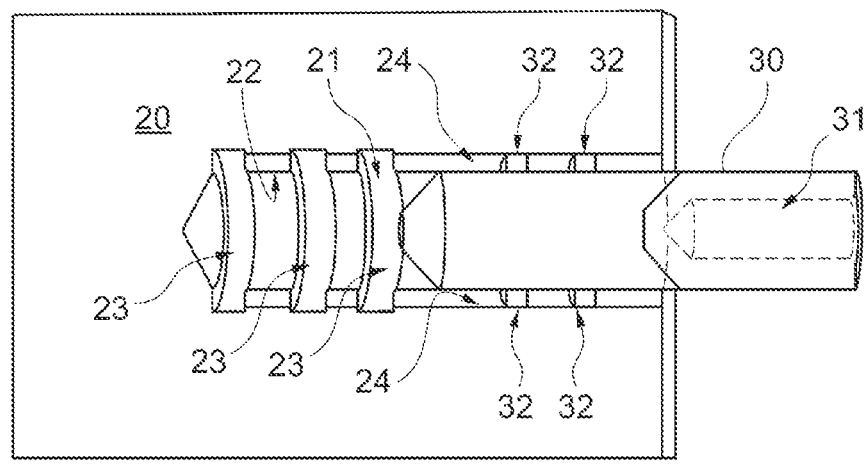
Figure 11:
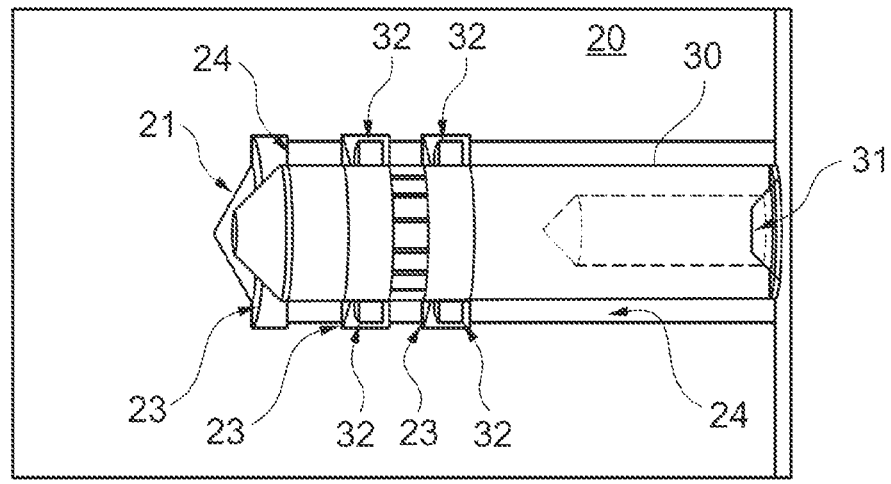
Figure 12:
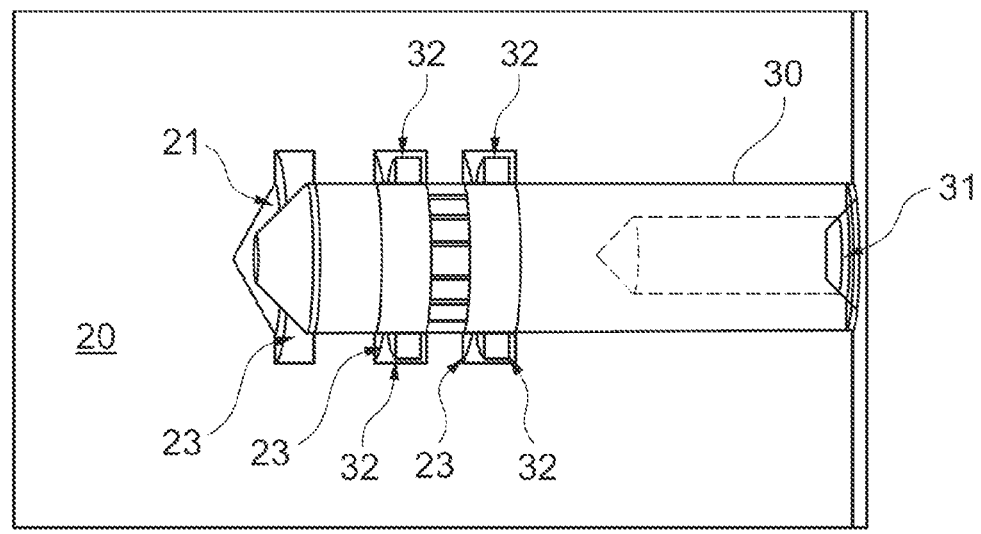

FIGS. 9 to 12 show various stages of the introduction and connection of an insert element 30 to the part 20. The insert element 30 may be manufactured e.g. from plastic or metal. In this variant, the connection is further reinforced by a direct form fit between the insert element 30 and the part 20. To this end, the insert part 30 has a plurality of projections 32, which protrude radially outward. As illustrated in FIG. 10, the projections 32 are guided through the introducing groove 24 when the insert element 30 is being introduced into the bore 21. Finally, as illustrated in FIG. 11, the insert element 30 reaches a position in which the projections 32 are arranged at the height of an annular undercut groove 23 in an axial direction. It could also be said that the projections 32 are respectively located at a crossing point of an introducing groove 24 and an undercut groove 23. By virtue of a rotation of the insert element 30 by 90°, for example, each of the projections 32 is guided out of the respective introducing groove 24 and into an undercut groove 23 (or it remains in the undercut groove 23). On account of the projections 32, a form fit in an axial direction is thus produced between the insert element 30 and the part 20, which is supplemented beyond the adhesive (which is not illustrated here) by the additionally present material bond and form fit. An extremely durable connection is thus produced when a screw, for example, is screwed into the cutout 31 in the insert element 30. In order to assist this, the cutout 31 may have an internal thread. In the event that the insert element 30 is manufactured e.g. from plastic, it would also be conceivable that the cutout 31 has a smooth-walled configuration at the start and the screw cuts a thread itself when it is being screwed in.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cutting tool for undercutting a bore in a component, the cutting tool comprising:
    a shaft portion extending in an axial direction relative to the component and having a maximum shaft radius; and
    at least one tangentially and axially primary cutting portion projecting radially with respect to the shaft portion further than the maximum shaft radius, each primary cutting portion comprising a tangentially arranged lateral cutting edge configured to form a tangentially extending groove in the component,
    wherein at least one primary cutting portion of the at least one tangentially and axially primary cutting portion has a front cutting edge arranged axially at a front end thereof and configured to form an axially extending groove in the component,
    wherein the shaft portion includes a front depression formed on a front end thereof and is arranged adjacent to the front cutting edge, the front depression configured to receive material removed from undercutting the bore.

2. The cutting tool according to claim 1 further comprising at least one secondary cutting portion arranged axially to a rear of a respective primary cutting portion and spaced apart therefrom.

3. The cutting tool according to claim 2, wherein the at least one secondary cutting portion is axially aligned with the respective primary cutting portion.

4. The cutting tool according to claim 1 further comprising a plurality of secondary cutting portions spaced apart axially from each other.

5. The cutting tool according to claim 4, wherein the plurality of secondary cutting portions are axially aligned with each other.

6. The cutting tool according to claim 5, wherein the shaft portion has at least one tangentially extending lateral depression, each lateral depression configured to draw back radially with respect to adjacent regions of the shaft portion.

7. The cutting tool according to claim 1, wherein the shaft portion has at least one tangentially extending lateral depression, each lateral depression configured to draw back radially with respect to adjacent regions of the shaft portion.

8. The cutting tool according to claim 1, wherein the shaft portion has at least one lateral depression arranged axially adjacent to a respective primary cutting portion.

9. The cutting tool according to claim 1, wherein the shaft portion comprises:
    at least one lateral depression arranged axially adjacent to a respective primary cutting portion.

10. The cutting tool according to claim 1 further comprising:
    at least one secondary cutting portion arranged axially to a rear of a respective primary cutting portion and spaced apart therefrom,
    wherein the shaft portion includes at least one lateral depression arranged axially adjacent to a respective primary cutting portion.

11. The cutting tool according to claim 1 further comprising at least two secondary cutting portions offset tangentially in relation to one another and arranged axially at the same height.

12. A method for securing an insert element to a component, the method comprising:

forming a bore in the component;
inserting a cutting tool according to claim 1 into the bore to form an axially extending groove via the front cutting edge of the at least one primary cutting portion of the cutting tool;
rotating the cutting tool within the bore to form a tangentially extending groove via the tangentially arranged lateral cutting edge of the at least one primary cutting portion of the cutting tool;
guiding the cutting tool out of the bore, wherein the at least one primary cutting portion of the cutting tool is guided through the axially extending groove; and
adhesively bonding the insert element into the bore, wherein an adhesive is introduced at least partially into the axially extending groove.

13. The method according to claim 12, wherein adhesively bonding the insert element into the bore comprises:
inserting the insert element into the bore such that at least one radial projection of the insert element is guided through the axially extending groove; and
rotating the insert element such that the at least one radial projection is guided out of the axially extending groove and into the tangentially extending groove.

14. A cutting tool for undercutting a bore in a component, the cutting tool comprising:
a shaft portion extending in an axial direction relative to the component and having a maximum shaft radius;
at least one tangentially and axially primary cutting portion projecting radially with respect to the shaft portion further than the maximum shaft radius, each primary cutting portion comprising a tangentially arranged lateral cutting edge configured to form a tangentially extending groove in the component; and
at least one lateral depression formed circumferentially in the shaft portion and arranged axially adjacent to a respective primary cutting portion,
wherein at least one primary cutting portion of the at least one tangentially and axially primary cutting portion has a front cutting edge arranged axially at a front end thereof and configured to form an axially extending groove in the component.

15. The cutting tool according to claim 14 further comprising at least one secondary cutting portion arranged axially to a rear of a respective primary cutting portion and spaced apart therefrom.

16. The cutting tool according to claim 15, wherein the at least one secondary cutting portion is axially aligned with the respective primary cutting portion.

17. The cutting tool according to claim 14 further comprising a plurality of secondary cutting portions spaced apart axially from each other.

18. The cutting tool according to claim 17, wherein the plurality of secondary cutting portions are axially aligned with each other.

19. The cutting tool according to claim 14 further comprising at least two secondary cutting portions offset tangentially in relation to one another and arranged axially at the same height.

\* \* \* \* \*